(12) United States Patent
Schreder et al.

(10) Patent No.: US 7,476,623 B2
(45) Date of Patent: Jan. 13, 2009

(54) METHOD FOR MICROSTRUCTURING FLAT GLASS SUBSTRATES

(75) Inventors: Bianca Schreder, Frankfurt (DE); Rainer Liebald, Nauheim (DE); Edgar Pawlowski, Stadecken-Elsheim (DE); Dirk Sprenger, Stadecken-Elsheim (DE); Dietrich Mund, Obersuessbach (DE); Juergen Leib, Freising (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 11/243,443

(22) Filed: Oct. 4, 2005

(65) Prior Publication Data
US 2006/0079094 A1 Apr. 13, 2006

(30) Foreign Application Priority Data
Oct. 9, 2004 (DE) .................. 10 2004 049 233

(51) Int. Cl.
*H01L 21/302* (2006.01)
(52) U.S. Cl. .................. 438/711; 438/717; 438/723; 438/736; 438/743; 216/67; 216/80
(58) Field of Classification Search .................. 438/711, 438/717, 723, 736, 743, FOR. 120, FOR. 388; 216/67, 80
See application file for complete search history.

(56) References Cited

U.S. PATENT DOCUMENTS

| | | | |
|---|---|---|---|
| 3,880,684 A | 4/1975 | Abe | |
| 4,374,156 A * | 2/1983 | Vong | .............................. 427/8 |
| 4,522,681 A | 6/1985 | Gorowitz et al. | |
| 4,711,698 A | 12/1987 | Douglas et al. | |
| 4,807,016 A | 2/1989 | Douglas et al. | |
| 4,904,341 A | 2/1990 | Blaugher et al. | |
| 5,213,659 A | 5/1993 | Blalock et al. | |
| 5,234,537 A | 8/1993 | Nagano et al. | |
| 5,284,549 A | 2/1994 | Barnes et al. | |
| 5,327,515 A | 7/1994 | Anderson et al. | |
| 5,413,670 A | 5/1995 | Langan et al. | |
| 5,417,799 A | 5/1995 | Daley et al. | |
| 5,961,361 A * | 10/1999 | Endoh et al. | .................. 445/49 |
| 6,039,851 A | 3/2000 | Iyer et al. | |
| 6,814,898 B1 * | 11/2004 | Deeman et al. | ............. 264/1.33 |
| 7,115,517 B2 * | 10/2006 | Ye et al. | ...................... 438/700 |
| 2003/0054176 A1 * | 3/2003 | Pantano et al. | .............. 428/429 |
| 2004/0198062 A1 * | 10/2004 | Ye et al. | ...................... 438/706 |
| 2004/0247826 A1 * | 12/2004 | Conzone et al. | ............. 428/131 |
| 2006/0003170 A1 * | 1/2006 | Saito et al. | ................... 428/426 |

(Continued)

FOREIGN PATENT DOCUMENTS

DE 23 40 442 2/1975

(Continued)

*Primary Examiner*—N Drew Richards
*Assistant Examiner*—Joannie A Garcia
(74) *Attorney, Agent, or Firm*—Michael J. Striker

(57) ABSTRACT

In the method for microstructuring flat glass substrates a substrate surface of a glass substrate is coated with at least one structured mask layer and subsequently exposed to a chemically reactive ion etching process (RIE) with at least one chemical etching gas. In order to provide the same or a higher quality etching and etching rate even for economical types of glass the chemical etching gas is mixed with at least one noble gas, so that the proportion of sputtering etching in the ion etching process is significantly increased.

8 Claims, 1 Drawing Sheet

U.S. PATENT DOCUMENTS

2006/0062129 A1 * 3/2006 Saito et al. ............... 369/272.1

FOREIGN PATENT DOCUMENTS

| DE | 69223534 | 7/1998 |
| --- | --- | --- |
| DE | 69409897 | 8/1998 |
| DE | 198 44 025 | 3/2000 |
| DE | 19844025 | 3/2000 |
| DE | 69325640 | 3/2000 |
| DE | 10222960 | 12/2003 |
| EP | 0 206 055 | 12/1986 |
| EP | 0296419 | 12/1988 |
| EP | 0 442 488 | 8/1991 |
| EP | 0 644 462 | 3/1995 |
| EP | 0644462 | 3/1995 |
| EP | 1 193 747 | 4/2002 |
| WO | 98/15504 | 4/1998 |

\* cited by examiner

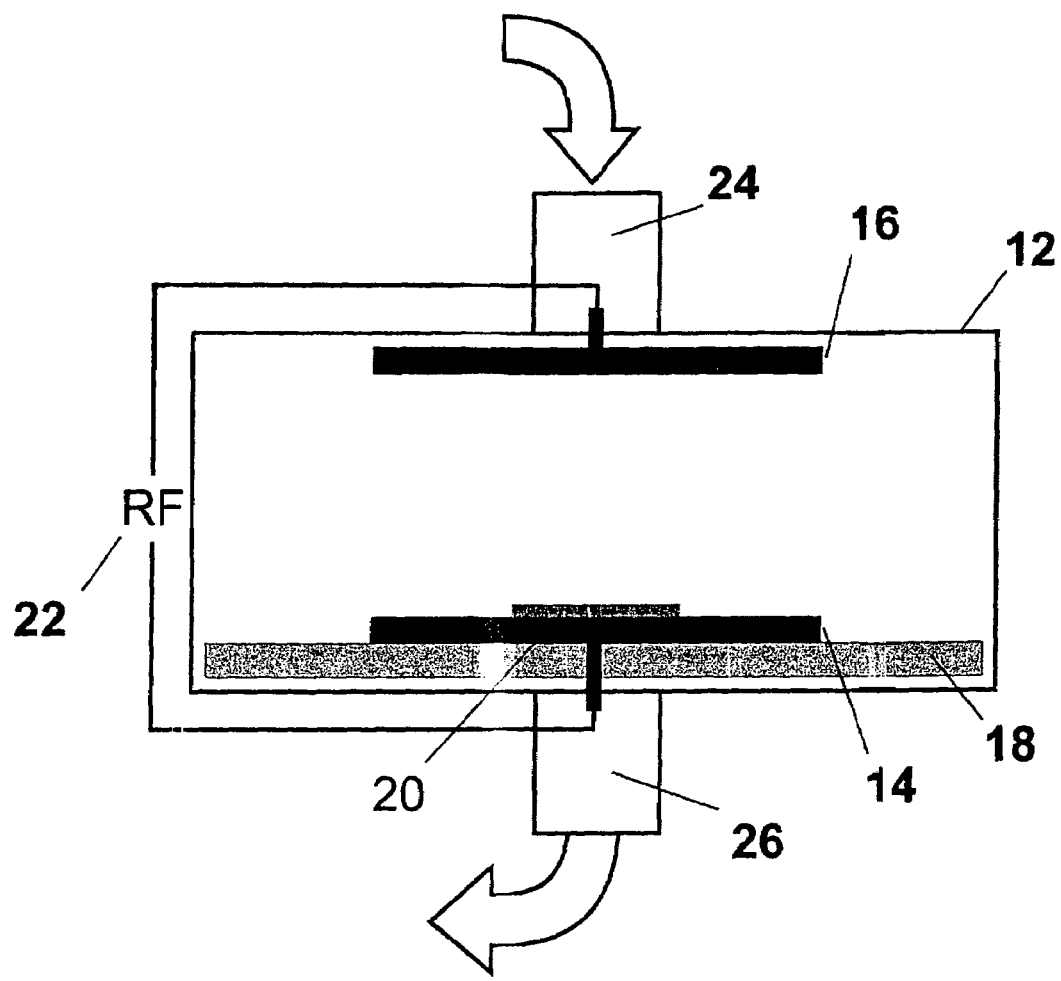

METHOD FOR MICROSTRUCTURING FLAT GLASS SUBSTRATES

BACKGROUND OF THE INVENTION

1. The Field of the Invention

The present invention relates to a method for microstructuring glass substrates, especially flat glass substrates. A substrate surface of the glass substrate is coated with at least one structured mask layer and subsequently exposed to a chemically reactive ion etching process (RIE) with at least one chemical etching gas.

Microstructures provided in glass change the optical properties of the glass. These microstructures are, among other things, required for diffractive optical elements (DOE) and for micro-optical elements, for example in projection and objective systems, in optical filters, in beam formation, as well as beam correction and color correction, but also in fluidics, in micro-reactors and other applications.

2. Related Art

In EP 0 644 462 B1 a method is disclosed, in which the v bn manufacture of microstructures on substrates by reactive ion beam etching (RIBE) takes place. In this method an ion source with an inlet tube for a reactive gas or gas mixture and a cathode is used. Preferably a fluorine-containing gaseous etching agent, for example $CF_4$ or $CHF_3$, is used. Also a mixture of reactive gas an inert gas can be used. However the components and the etching apparatus are exposed to high stresses or loads by reactive ion beam etching. Also the required structures cannot be obtained with justifiable costs by this etching method.

DE 198 44 025 A1 describes different dry etching processes for working optical surfaces and for transferring optical structural elements to optical materials for microstructuring quartz, quartz glass and quartz-containing surfaces. Also a reactive ion etching process (reactive ion etching, RIE) is described, in which $CF_4$, $C_2F_6$ or $CHF_3$ are used as principal components of the etching gas mixed with $SF_6$, $XeF_2$, $NF_3$ or $CH_4$, as well as an ion beam etching process for local surface working. The ion energies should be greater than 600 eV, in order to guarantee a sufficiently high sputtering fraction in the etching process. A disadvantageous increase in surface roughness can be avoided by selection of the etching gas. However no etching rates, which are sufficient for current applications, may be obtained by the described methods for some preferred types of glass.

Ezz Eldin Metwalli and Carol G. Pantano, in "Nuclear Instruments and Methods" in Physics Research B 207 (2003), pp. 21-27 have described a method of magnetically enchanced reactive ion etching, MERIE, of silicon-containing and phosphate-containing glass, on the one hand, in a $CF_4/CHF_3$-plasma and, on the other hand, for comparison purposes in an argon plasma. Especially it was found that the MERIE method can be superior to conventional RIE regarding etching rate and that the etching rate of glass in fluorocarbon 20 plasmas decreases with increase of chemically removable oxides in the glass. Silicate glass, boron-containing glass and glass with other components have a significantly lower etching rate in comparison to phosphate-containing glass in pure argon plasma. The comparatively higher etching rate with phosphate-containing glass is based on the fact that the etching mechanism is controlled by physical sputtering and thus the comparatively low binding energy on the phosphate glass surface can be overcome. However these results do not apply to the use of $CF_4$ plasma. In that case the etching rate for quartz glass is clearly above the etching rate of other tested glasses. The cause for this is apparently that volatile $SiF_4$ was produced during chemical etching of $SiO_2$. Glasses with ingredients, which produce non-volatile fluorides, have been considered up to now as difficult or impossible to etch, among other things because of poor surface roughness.

SUMMARY OF THE INVENTION

It is an object of the present invention to provide a method for microstructuring flat glass substrates of the above-described kind, by which the above-described problems are overcome.

It is especially an object of the present invention to provide a method for microstructuring flat glass substrates of the above-described kind, which provides high quality structures with great structure depth with smaller structure dimensions and with as high as possible an etching rate.

It is an additional object of the present invention to provide a method for microstructuring flat glass substrates of the above-described kind, which is also provides good results with economical glasses, which currently were considered to be unsuitable because of the poor chemical solubility of their ingredients for microstructuring in RIE processes.

This object and others which will be made more apparent hereinafter is attained in a method for microstructuring flat glass substrates, in which a substrate surface of a glass substrate is coated with at least one structured mask layer and subsequently exposed to a chemically reactive ion etching process (RIE) with at least one chemical etching gas.

According to the invention the chemical etching gas is mixed with at least one noble gas, so that the proportion of sputtering etching in the ion etching process is significantly increased.

Additional advantageous features are described and claimed in the appended dependent claims.

The dry etching method according to the invention by means of RIE forms microstructures on glass substrates, usually flat glass. The glass used can have a thickness of about 50 µm to up to 16 mm (BF 40 samples). The substrate surface is first coated with at least one structured mask layer and subsequently chemically etched with a reactive ion etching method with at least one chemically etching gas. Instead of an RIE method a MERIE method can also be used in the method of the invention, in which the RIE process is magnetically assisted. The ion etching process differs from the state-of-the-art method because the chemical etching gas is mixed with at least one noble gas, so that the proportion of the sputtering etching is increased significantly in the reactive ion etching method.

Thus the advantages of the chemical plasma etching, in which a chemical reaction with the reaction gas occurs and volatile gases are formed, and physical sputtering etching, in which atoms and clusters are released by mechanical impact by bombardment with ions, are combined especially significantly with each other in unexpected ways. Ingredients, which are not chemically released and remain, are released by physical sputtering. This leads, on the one hand, to high etching rates and, on the other hand, to a more precise structure transfer with very small structure dimensions because of the anisotropic erosion due to sputtering. Furthermore a surface with reduced roughness, which scarcely differs from the roughness of the substrate glass, is produced. This RIE process does not significantly increase the surface roughness in comparison to an unetched glass surface. In contrast even improved roughness could be observed. Also the surface roughness did not depend on the plasma power used in the method.

It has been surprisingly established that a considerable increase of the etching rate results from the use of an etching gas mixture of at least one etching gas and a noble gas in comparison to both a purely physical etching and also a purely chemical etching. This increase of etching rate may not be explained with the known models, according to which glasses with a high silicon dioxide content have a higher etching rate than those with a reduced $SiO_2$ content, and nearly the same etching rates to multi-component flat glasses were found in purely physical etching. Surprisingly especially good results are obtained for types of glass, for which no good chemical etching results can be expected. This again is based on the unexpected combination of physical and chemical components of the etching method.

In tests it has been shown that $CF_4$ is especially suitable as a chemical etching gas and argon ions are especially suitable as sputtering gas. Especially the combination of both these gases leads to a high etching rate. The method according to the invention is however not limited to both these gasses. Furthermore mixing with other etching gases, for example $CHF_3$, $C_2F_6$ and $SF_6$, and other sputtering gases (noble gases), for example Ne, Kr and Xe, has proven to be advantageous.

Furthermore in a surprising way varying the composition of the $CF_4$ and argon in the etching gas maximizes the etching rate. In a particularly preferred embodiment of the invention the $CF_4$ and argon are present in the etching gas in a mixture ratio between 1:1 and 6:1, preferably in a mixture ratio between 2:1 and 6:1, especially preferably in a mixture ratio between 2:1 and 4:1, and most preferably in a mixture ratio of about 3:1, so that the $CF_4$ is the major portion of the etching gas.

Different types of glass react very differently to a variation of the composition of the etching gas (especially the variation of the relative amounts of $CF_4$ and argon) in the RIE method according to the invention, as shown by use of the method. $SiO_2$ is rapidly chemically etched with $CF_4$ so that its chemical etching rate is comparatively large. Glass that contains aluminum, titanium, alkali oxides and other ingredients is comparatively more difficult to etch chemically. It has been shown that especially the etching rate of these more difficult-to-etch types of glass can be considerably increased (especially with increases in the proportion of the etching due to sputtering by argon ions). A comparatively high etching rate, which has a pronounced maximum when etching gas composition is varied, is obtained with flat glass containing $SiO_2$ and $B_2O_3$ in a sum total amount of from 60 to 90 (even 95) percent by weight, such as Schott Glass Type BF 40 and AF 45. A very much smaller etching rate results with other types of Schott Glass, e.g. 8261, 8264, BF 33 and B270, under comparable conditions. The above-described maximum was not observable or was substantially weaker with these latter glass types. That means that different glass types react differently to the physical components during etching erosion, namely to the accompanying argon ions. This behavior is surprising and could not be expected from the results of the comparative experiments. These comparative experiments were performed in an ion beam apparatus with an argon ion beam (purely physical erosion or removal). The etching rate in these comparative experiments depends only weakly on the glass type.

It is known that silicon oxide glass may be satisfactorily etched. However this glass is difficult to produce and is expensive in comparison to multi-component glass. Furthermore wafer manufacture from flat glass is simpler and more economical than with $SiO_2$ or other bulk glasses. A preferred embodiment provides that the method according to the invention is performed with a multi-component glass, which contains at least three components. It has been shown that a series of these multi-component glasses have an etching rate behavior and structure transfer precision comparable to that of silicon oxide glass, in so far as the method according to the invention is concerned. The RIE method according to the invention thus allows economical starting materials to be used without loosing etching quality and rate.

Suitable multi-component glass especially includes those with oxide ingredients, which preferably contain $SiO_2$ and above all contain boron oxide, aluminum oxide and/or at least one alkali oxide. Borosilicate glass is most preferred. Economical boron-containing flat glasses of Schoft AG marketed under the trade names BF 40 [about 93% ($SiO_2$+$B_2O_3$) and 7% ($Na_2O$, $K_2O$, $Al_2O_3$)] and AF 45 [about 64% ($SiO_2$+$B_2O_3$) and 36% (BaO, $Al_2O_3$)] have especially good etching behavior. However it is also possible to apply the method according to the invention to glass that is non-oxidic.

The dependence of etching rate for different types of glass on process gas pressure was measured for a pure $CF_4$ plasma and it was established in a surprising way that the optimum pressure is in a region from 30 mtorr (about 4000 Pa) to 60 mtorr (about 8000 Pa). The etching rate decreases with increasing process gas pressure above about 60 mtorr. This dependence is based on the fact that the ion etching method is always a combination of chemical reaction (by reactive radicals of the etching gas) and physical erosion (by ion bombardment with plasma ions). At high pressure and thus inherently reduced bias voltage the physical etching component is small, but at very low pressure sufficient reactive radicals of etching gas are not available.

A preferred embodiment of the method according to the invention provides that the substrate surface is coated with a metal layer and the metal layer is structured before performing the RIE and/or MERIE method. A chromium layer has proven especially satisfactory as the metal layer. The structured metal layer is used as a mask layer for the subsequent chemically reactive ion etching method according to the invention. The chromium layer is especially suitable for this type of dry etching process, since it is comparatively resistant to etching gas, such as $CF_4$, $SF_4$ or mixtures of these gases with e.g. argon. In contrast photo resist layers cover the substrate surfaces only about 10 min in etching plasma with the above-described etching gas and are completely removed in this time period by the etching gas plasma. A shading or shadow effect can easily occur with the thicker resist layers.

The metal and/or chromium coating occurs preferably using a magnetron sputtering method, by which suitable layer thickness is provided on the substrate, which are of the order of 150 nm.

The metal and/or chromium coating is likewise attacked during the etching process and at least partially etched away. In order to avoid or eliminate a process step comprising subsequent removal of the remaining metal and/or chromium layer, in a further preferred embodiment of the invention the thickness of the metal and/or chromium layer is selected so that it is completely etched away during the etching process.

A photolithographic process for structuring the chromium layer is added following this coating process according to a further preferred embodiment of the method according to the invention. Here it is of advantage to coat a resist layer on the metal layer. Subsequently the resist layer can be illuminated with a mask and developed so that the metal layer is exposed on certain desired areas. Subsequently the exposed metal layer areas are removed by etching.

It has been advantageously established that the resist layer is stabilized when a soft-bake treatment occurs after application of the resist layer and/or a hard-bake treatment occurs after development of the resist layer.

The metal mask layers are removed by wet chemical methods, for example with sulfuric acid, after the ion etching method according to the invention has been performed.

BRIEF DESCRIPTION OF THE DRAWING

The objects, features and advantages of the invention will now be illustrated in more detail with the aid of the following description of the preferred embodiments, with reference to the accompanying sole FIGURE, which is a schematic cross-sectional view of an apparatus for microstructuring, which performs the method according to the invention.

DESCRIPTION OF PREFERRED EMBODIMENTS

A plasma reactor, in which a cathode 14 and an anode 16 are arranged opposite to each other in a vacuum chamber 12, is shown in the FIGURE. A cooling device 18 cools the cathode 14.

A sample 20, especially made of flat glass, rests on the cathode 14, which is subjected to microstructuring. A high frequency RF generator 22 is provided, which produces high frequency electrical power, which is coupled or introduced into the sample 20 by means of the cathode 14. Furthermore the RF generator 20 is connected with the anode 16.

The vacuum chamber 12 contains an inlet 24 and an outlet 26, through which the respective gas mixtures enter and leave.

Experiments were performed with two flat glass samples made of Schott Glass BF 40 and Schott Glass AF 45 respectively, which acted as substrates and had a size of about 50×50 mm$^2$. A surface of each flat glass substrate was coated with a chromium coating of 150 nm thick in a magnetron sputtering process. After that a photolithographic process for structuring the chromium was performed.

In this photolithographic process first a resist AZ 5214 E (Manufacturer: Clariant) was spun on for 3 seconds at 1000 rpm and for 40 seconds at 4000 rpm so that a resist thickness of 1.4 μm was attained. The resist layer was subjected to a soft-bake process at 105° C. for 3 minutes. Subsequently the resist with a test mask in a mask aligner was illuminated with radiation at 25 mW/cm$^2$ for 5 sec. In order to determine the minimal structure resolution, an electron beam written mask was used. The resist was then developed with a developer AZ 826 MIF (Manufacturer: Clariant), with a developing time of 40 sec. Subsequently the resist was subjected to a hard-bake process at 120° C. for 5 min. Then the chromium layer was structured with chromium etch at 50° C. and with an etching time of 20 sec. The chromium-etch etching bath comprises 150 g (NH$_4$)$_2$Ce(NO$_3$)$_6$ and 35 ml CH$_3$COOH (96%) in 1000 ml DL water.

The chromium layer structured in this way serves as a mask layer for subsequent dry etching processes, which for example occurred in the above-described plasma reactor with an HF plasma power of 300 W and a process gas pressure of 58 mtorr over a time period of 21 min. Experiments were performed with three different etching gas mixtures of CF$_4$/Ar:
  a. pure CF$_4$:CF$_4$ flow rate: 49 sccm
  b. CF$_4$:Ar=3:1:CF$_4$ flow rate:49 sccm, Ar flow rate: 17 sccm
  c. CF$_4$:Ar=2.0:1:CF$_4$ flow rate: 49 sccm, Ar flow rate:24.5 sccm
  d. CF$_4$:Ar=1:1:CF$_4$ flow rate: 24 sccm, Ar flow rate: 24.5 sccm It was shown that the gas composition had an influence on the resulting bias voltage. With the above-described process parameters a bias voltage of −540 V resulted with pure CF$_4$. Experiments were performed with a mixture series of 1:1.2, 4:1, 2.9:1, 3.5:1 and 4.9:1 at a plasma power of 300 W. The bias voltage was in the vicinity of −540 V.

The chromium mask layers were removed wet-chemically with sulfuric acid after the etching process.

The tests in the plasma reactor were performed with an HF plasma power of 300 W and a total flow rate of input operating gas between 49 and 66 sccm. However for industrial applications considerably higher HF plasma power (for example up to about 3000 W) and higher total flow rate values (for example up to 300 sccm) are recommended, in order to increase the etching rate.

The etched substrate surface was subjected to detailed observation with a microscope to determine the structure and with a mechanical surface profile meter (Manufacturer: Dektak 3) to determine the etching depth, the profile course and the surface roughness in order to test the quality of the transfer of structure from the mask to the glass.

Increasing the physical component of the etching action by argon ions by variation of the gas composition, acts differently on different types of glass. This increase causes a greater removal of the chromium resist mask.

It was established by variation of the gas composition that the physical component of the etching action by bombardment of the surface with argon ions had a significant influence on the etching rate. With a composition CF$_4$:Ar=3:1 there is a considerable increase in etching rate, in fact 2.5-fold increase, in comparison with pure CF$_4$. The maximum etching rate for BF 40 was found to be in a range between 3.5:1 to 4.9:1. The etching rate then falls off with further increasing argon fraction. However the etching rate is always higher than with pure CF$_4$ with a composition CF$_4$:Ar=1:1 for Schott Glass BF 40.

The surface roughness in the case of plasmas in gas mixtures with some argon present was significantly different than with pure CF$_4$ plasmas. Very small structure dimensions of 1 to 2 μm could be obtained with the process according to the invention. Etching depths of 600 nm could be obtained with etching times of about 20 min. Experiments were performed, in which the process gas pressure was varied between 30 mtorr and 160 mtorr. It was shown that the bias voltage depends on the selected process gas pressure and drops off with increasing process gas pressure in the process according to the invention. It was also shown that the optimal process gas pressure is in a range between 30 mtorr and 60 mtorr. The etching rate decreases with increasing process gas pressure above about 60 mtorr.

The manufacture of electronic, especially of opto-electronic components, is an especially preferred embodiment for the microstructuring method according to the invention. Suitable wafer packaging methods for manufacture of image chips are described in DE 102 22 960 A1. By these methods additional optical elements (for example micro lens arrays or DOES) are embedded in cover glasses, whereby the electronic components can be formed so that they are compact and space-saving. The optics can comprise an economical multi-component glass instead of quartz glass, silica or the like.

For example, at least one flat glass wafer and silicon wafer is used for the manufacture in which the silicon wafer is structured and has a number of sensor active and/or determining elements. The glass wafer is provided with cavities (e.g. using wet-chemistry etching) at positions corresponding to the elements of the silicon wafer. Additional optical elements (such as micro lens arrays or diffractive optical elements) are provided on the side of the cavities and/or on the opposite surface of the glass wafer at positions corresponding to the elements in the silicon wafer by means of the microstructuring method according to the invention. Both wafers are now bonded together and then isolated, so that individual structural components, e.g. image chips, are produced. Since the optical elements on the glass wafer are applied to the elements of the silicon wafer before the isolating, only one adjusting step per wafer pair is required. The cavities should guarantee a sufficient spacing between the glass wafer surface and the elements of the silicon wafer. Also other suitable structure spacing or bonding layers between both wafers can be added instead of the cavities.

The microstructuring method according to the invention has further applications in the field of micro-optics, in which beam formation, beam deflection or wavelength selection (filtering) can take place. For example the method can be used for optics for digital cameras or for laser diodes. The specific optical structures that can be made by the microstructuring method according to the invention are Bragg diffraction gratings, diffractive optical elements, phase holograms, microlenses (arrays) and Fresnel (zone) lenses.

The disclosure in German Patent application 10 2004 049 233.6-45 of Oct. 10, 2004 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method of microstructuring flat glass substrates, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method for microstructuring flat multi-component glass substrates, said method comprising the steps of:
    a) coating a substrate surface of a flat glass substrate with a metal layer;
    b) subjecting the metal layer to a structuring process to form at least one structured mask layer, said flat glass substrate consisting of a multi-component glass containing at least three oxide ingredients;
    b) mixing a chemical etching gas with at least one noble gas in a mixture ratio of the chemical etching gas to the at least one noble gas of from 2:1 to 6:1 in order to form an etching gas mixture; and
    c) performing a chemically reactive ion etching process in which the substrate surface coated with the at least one structured mask layer is exposed to the etching gas mixture;
    wherein sputtering etching occurring in the ion etching process is significantly increased by the presence of the at least one noble gas in the etching gas mixture but a major portion of the etching gas mixture consists of the chemical etching gas.

2. The method as defined in claim 1, wherein said metal layer is a chromium layer.

3. The method as defined in claim 1, wherein said metal layer is applied to the substrate surface using a magnetron sputtering process in order to coat said substrate surface with said metal layer.

4. The method as defined in claim 1, wherein the metal layer has a thickness such that the metal layer is completely etched away in subsequent ion etching processes.

5. The method as defined in claim 1, wherein the metal layer is structured by a photolithographic process.

6. The method as defined in claim 1, wherein a resist layer is applied to the metal layer, said resist layer is illuminated and then developed and subsequently illuminated metal regions are etched away.

7. The method as defined in claim 6, further comprising a soft-bake treatment after etching away the resist layer and/or a hard-bake treatment after developing the resist layer.

8. The method as defined in claim 1, further comprising removing metal mask layer residue after the ion etching process by wet chemical methods.

\* \* \* \* \*